United States Patent [19]

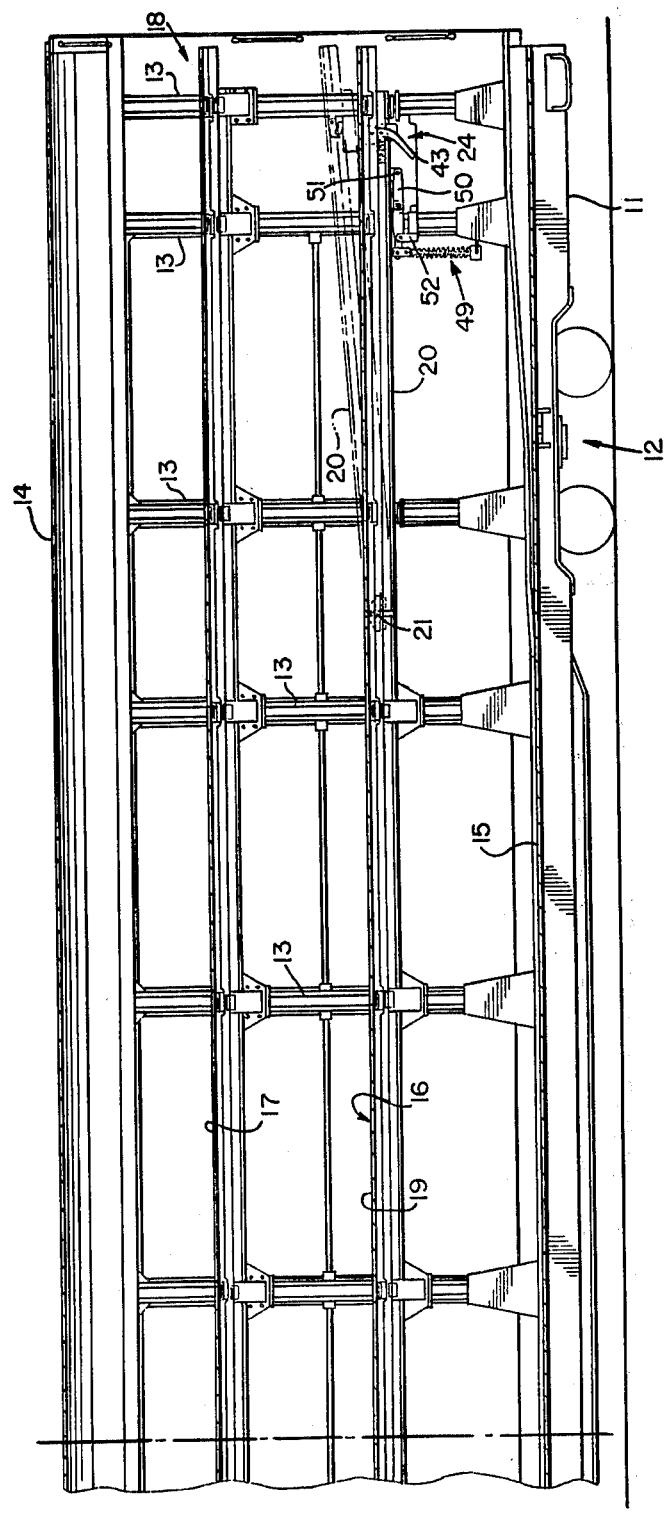

Naves et al.

[11] 4,149,472
[45] Apr. 17, 1979

[54] RAILWAY CAR TILTING DECK LOCK

[75] Inventors: David G. Naves, Calumet City, Ill.; Herman A. Aquino, Hobart; Robert J. Mish, Merrillville, both of Ind.

[73] Assignee: Pullman Incorporated, Chicago, Ill.

[21] Appl. No.: 772,199

[22] Filed: Feb. 25, 1977

[51] Int. Cl.² .................. B60P 3/08; B61D 3/04; B61D 3/16; F16F 1/06
[52] U.S. Cl. .................. 105/368 R; 105/370; 211/13; 267/72; 292/213; 292/219; 296/1 A
[58] Field of Search .......... 105/368 R, 370; 211/13; 267/69, 71, 72; 292/2, 128, 219, 213; 296/1 A

[56] References Cited

U.S. PATENT DOCUMENTS

| | | | |
|---|---|---|---|
| 402,074 | 4/1889 | Trost et al. | 292/219 |
| 2,067,724 | 1/1937 | Nampa | 105/368 R |
| 2,583,734 | 1/1952 | Francis | 296/1 A |
| 3,205,836 | 9/1965 | Wojcikowski | 296/1 A |
| 3,426,704 | 2/1969 | Blunden | 105/368 R |
| 3,690,717 | 9/1972 | Taylor | 105/368 R X |
| 3,738,481 | 6/1973 | Cwycyshyn et al. | 105/368 R X |
| 3,797,410 | 3/1974 | Blunden | 105/368 R |
| 3,866,543 | 2/1975 | Richard | 105/368 R |
| 3,902,613 | 9/1975 | Newland | 105/368 R |

Primary Examiner—Albert J. Makay
Assistant Examiner—Howard Beltran
Attorney, Agent, or Firm—Thomas G. Anderson

[57] ABSTRACT

A railway car comprises a plurality of vertically disposed decks above the floor of the car. The first deck includes a rigid deck section having at opposite ends thereof hinged deck sections which may be moveable from a load carrying position upwardly to a raised position to facilitate loading of the car floor. The hinged deck sections are provided with counterbalancing means and a lock is provided for locking the sections either in the raised or lowered positions whereupon vehicles may be driven onto the deck sections.

10 Claims, 9 Drawing Figures

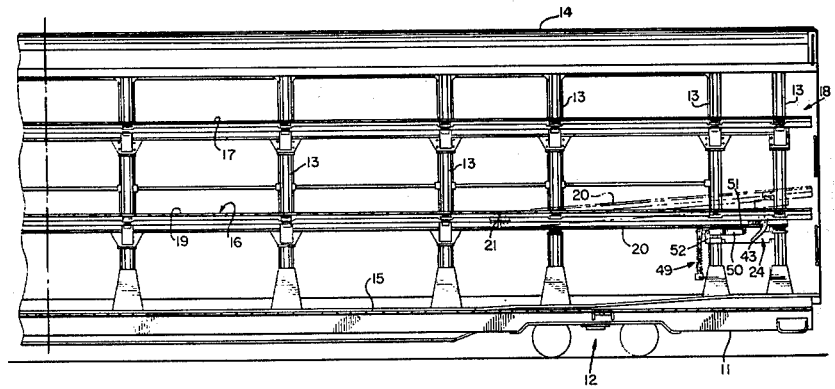

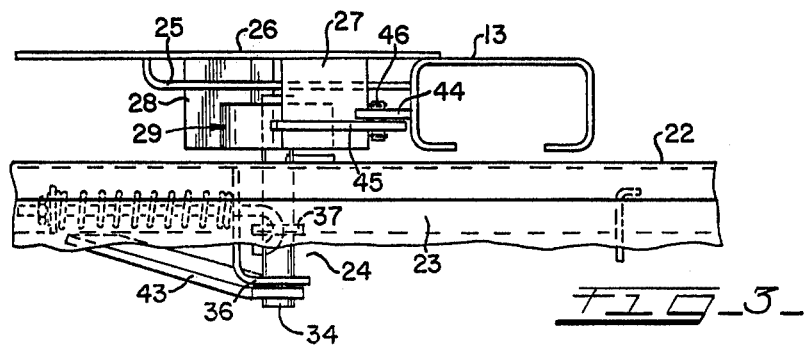
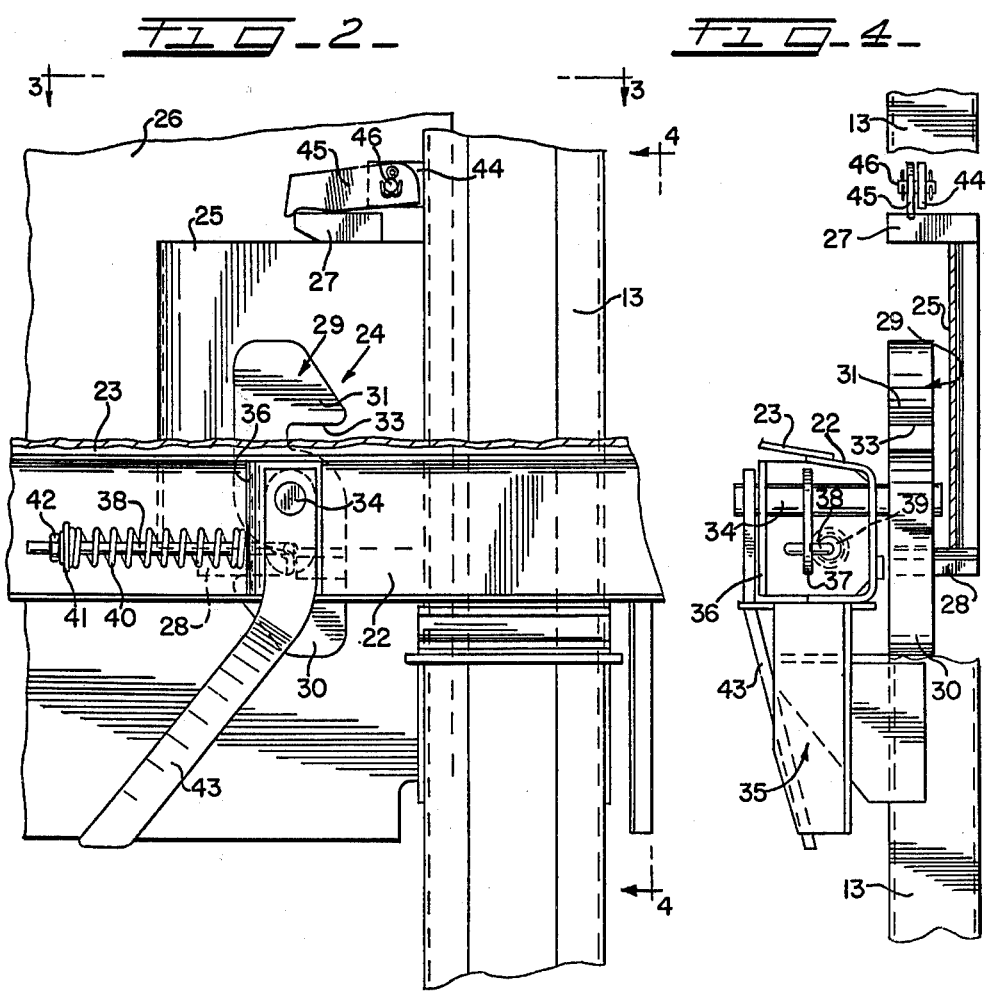

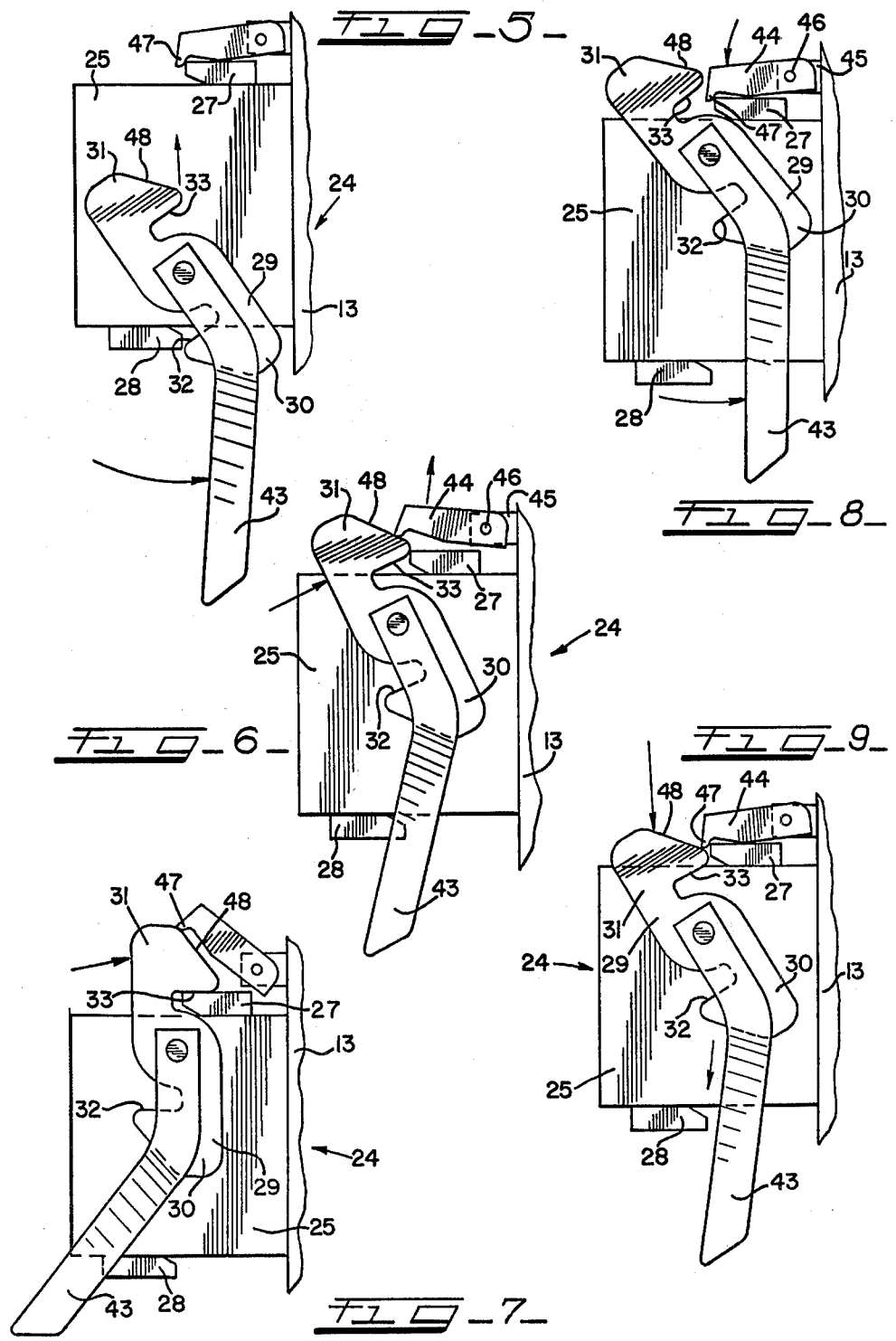

RAILWAY CAR TILTING DECK LOCK

BACKGROUND OF THE INVENTION

1. Field of the Invention

The present invention relates to railway cars and those particularly having auto carrying racks mounted theron which may be used for transporting vehicles.

2. Description of the Prior Art

The prior art is disclosed in U.S. Pat. Nos. 3,426,704 Feb. 11, 1969, 3,738,481 June 12, 1973, 3,797,410 June 13, 1972, 3,866,543 Feb. 18, 1975 and 3,902,513 Sept. 2, 1975.

SUMMARY OF THE INVENTION

The railway car of the present invention comprises a plurality of decks positioned above the floor which are utilized to support vehicles loaded from opposite open ends of the car. The deck immediately above the floor is provided with a centrally disposed rigid deck section supported on a plurality of longitudinally spaced upright posts supported on the car. On opposite ends of the rigid deck section there are provided hingedly moveable deck sections which may be raised upwardly at their ends to facilitate the loading of vehicles onto the lower platform or floor of the car. The hinged decks may be easily raised and lowered since they are connected to a counterbalancing arrangement which is supported on the side posts and which includes a lever pivotally connected to the deck to continually counterbalance and provide for relative ease of lowering and raising the ends of the hinging deck sections. The counterbalancing system is best shown in a related patent application Ser. No. 772,200 filed Feb. 25, 1977.

Immediately adjacent to the counterbalancing mechanisms of the present car there are provided locking mechanisms which will lock the hinged deck sections in either a lowered position or a raised position as desired. Each locking mechanism includes a latch having upper and lower hook shaped configurations extending in opposite directions and having noses defined by upper and lower keeper engaging open end slots. Keepers are so mounted on the post structure of the car to be engaged by the open end recesses of the latch for firmly securing the hinged deck in either a lowered or raised position. A suitable spring arrangement secured to the latch member normally biases the latch member in a vertically disposed or locked position in relation to each of the upper and lower keeper member.

A latch member is disposed on opposite sides of the hinged decked sections so that they may be secured in either of raised or lowered positions. The upper keeper members are also provided with a locking device which during hinge movement upwardly of the deck section is disengaged from the upper keeper member to permit movement of the upper keeper engaging recess into engaging position with respect to the upper keeper. The same locking device however, when it is desired to move the hinged deck section to its downward position, prevents reentry or engagement of the upper keeper 27 as the hinged section is moved downwardly.

BRIEF DESCRIPTION OF THE DRAWINGS

FIG. 1 is a side elevational view of one end portion of a railway car showing an improved rack arrangement for carrying vehicles;

FIG. 2 is an enlarged cross-sectional view showing partially in elevation an improved locking mechanism;

FIG. 3 is a cross-sectional view taken substantially along the line 3—3 of FIG. 2;

FIG. 4 is an elevational view partially in section taken along the line 4—4 of FIG. 2; and FIGS. 5, 6, 7, 8, and 9 are schematic views showing various positions of a latch and locking arrangement.

DESCRIPTION OF THE PREFERRED EMBODIMENT

Referring particularly to FIG. 1 a railway car 10 for carrying automobile and other similar vehicles includes an underframe 11 suitably supported on wheel trucks 12. A railway car 10 includes a rack structure consisting of a plurality of longitudinally spaced upright posts 13 positioned on opposite sides of the car 10. The car 10 also is provided with a top roof 14 and lowered deck or floor 15. A first upper deck 16 is suitably supported on the posts 13 which also supports a second upper deck 17. The car is provided with opposite open ends 18 through which the decks may be loaded by conventional loading mechanism. The first upper deck includes a first rigid intermediate deck section 19 which at opposite ends has pivotally or hingedly connected thereto second deck sections 20. A plurality of hinge brackets 21 suitably connect the hinged deck sections 20 to the first rigid deck section 19. The hinged deck section includes a pair of spaced channels 22 supporting a platform 23.

A locking arrangement designated at 24 is provided to maintain the hinged deck sections in either raised or lowered positions. The locking arrangement 24 comprises a vertical plate 25 suitably supported on one of the side post 13 and on a second plate 26 also supported on said side post. As best shown in FIGS. 2, 3, and 4, upper and lower keeper members 27 and 28 respectively are supported on plate structures 25 and 26 and project inwardly with respect thereto adjacent to the sides of said hinged deck sections. Each looking arrangement includes an S-shaped latch arm 29 which is provided with upper and lower hook shaped portions or noses 30 and 31. The noses 30 and 31 each include keeper engaging open end slots 32 and 33 respectively extending in opposite directions as indicated. The latch arm 29 is suitably supported on a pivot shaft 34 for rotation therewith. The shaft 34 is supported by means of bracket structure 35 in turn supporting an angle shaped bracket 36 connected to the channel 22. An arm 37 as best shown in FIG. 4, is connected to pivot shaft 34 and has connected thereto a tension rod 38 which projects through an opening 39 in the bracket 36 and has supported thereon a spring 40 held captive by means of a spring retainer 41 and nut 42. The spring and tension rod assembly continually bias the latch arm 29 in a vertical or lock position shown in FIG. 2. The latch arm 29 may be suitably rotated by means of a hand lever 43.

Referring particularly to schematic views FIGS. 5 through 7, a blocking element 44 is supported on a bracket 45 by means of a pivot pin 46. The bracket 45 is suitably supported on one of the posts 13 above the upper keeper member 27. The blocking element 45 includes a nose portion 47 which in FIG. 8 is shown in position overlying the end of the keeper member 27. The nose 31 of the latch 29 also includes an inclined surface 48 which is adapted to be engaged by the nose 47 in sliding relation as shown in FIG. 6.

FIG. 1 also generally discloses a counterbalancing mechanism 49 including a lever 50 pivotally connected as indicated at 51 to the hinged deck section 20 and also is pivotally supported as indicated at 52 on one of the side posts 13.

THE OPERATION

The locking mechanisms 24 are provided on opposite sides of the end of the hinged section. Upon release of the locking mechanism a counterbalancing arrangement 49 permits the structure to be easily raised and lowered. To disengage a locking mechanism from its lowered securing position of the hinged deck, the operator merely pulls on the levers 43 and disengages them from the lower keepers 27 whereupon the deck may now be raised. As the deck is raised the nose 31 of the latch as shown in FIG. 9 engages the blocking element 44 at its nose projection 47 and starts pivoting the blocking element 44 to an out-of-the-way position whereupon the keeper engaging slot 33 may now be placed in engagement with the upper keeper 27 as shown in FIG. 27. The nose 47 has moved upwardly and in sliding relation on the sliding surface 48 of the latch. The hinged deck section is now locked in its upper position. Upon, again disengaging or pivoting the lever 43 as shown in FIG. 8 disengagement or unlocking takes place and the blocking element 44 falls into the position shown. As the operator releases lever 43 the nose 31 slides downwardly on the nose 47 of the blocking element 44 until the latch is again in the position shown in FIG. 5 and the hinged deck section is again in its lowered locked position. Thus the latch arms may be readily disengaged and engaged securely to permit locking of the hinged deck section in raised or lowered position. Also disengagement from the raised position is facilitated in that the blocking element prevents reengagement of the latch arm as the deck is lowered. The counterbalancing mechanism is of course completely disclosed and more specifically described in the aforementioned application for patent.

What is claimed is:

1. In a railway car for transporting vehicles including a body,
   a deck supported on said car and having,
   a first deck section fixed on the car, and
   a second deck section hingedly connected to said first section for swinging movement upwardly to a raised position and downwardly to a lower position,
   a counterbalancing arrangement supported on said car for counterbalancing said second deck section between its positions, the improvement of a lock arrangement for locking said second deck selectively in each of its positions comprising:
   vertically spaced lower and upper keeper elements on said car,
   an S-shaped latch member pivotally mounted intermediate its ends on said second section,
   said latch member having first and second keeper engaging notches at opposite ends,
   said first and second keeper engaging notches of said latch member being adapted to selectively engage said lower and upper keepers respectively in locking relation to maintain said second deck section in its respective positions attendant to swinging said latch in first and second directions.

2. The invention in accordance with claim 1, and including biasing means connected to said second section and said latch member urging the same into locking relation relative to said keepers.

3. The invention in accordance with claim 2, and said notches on said latch facing in opposite directions.

4. The invention in accordance with claim 3, and said keepers being longitudinally offset relative to one another.

5. A railway car for transporting vehicles including a body having a lower floor,
   a plurality of longitudinally spaced upright side posts connected to said body on opposite sides of said floor,
   a deck supported on said side posts in vertical spaced relation above said floor and including,
   a first deck section rigidly connected to said posts,
   a second deck section hingedly connected to said first section adjacent one end of said car for swinging movement upwardly to a raised position and downwardly to a lower position,
   a counterbalancing arrangement supported on said car for counterbalancing said second deck section between its positions, the improvement of a lock arrangement for locking said second deck selectively in each of its positions comprising:
   a lower keeper element carried on said car,
   an upper keeper element on said car,
   a latch member pivotally mounted on said second section,
   said latch member having a first keeper engaging notch and a second keeper engaging notch,
   handle means on said latch member,
   said first and second keeper engaging notches of said latch member being adapted to selectively engage said lower and upper keepers respectively in locking relation to maintain said second deck section selectively in each of its positions,
   biasing means connected to said second section and said latch member urging the same into locking relation relative to said keepers,
   said notches on said latch facing in opposite directions,
   said keepers being vertically spaced and longitudinally offset relative to one another, and
   including a blocking means on said upper keeper element for blocking said second keeper engaging notch from reengagement during lowering movement of said second deck section after disengagement of said upper keeper element.

6. The invention in accordance with claim 5, and said blocking means comprising a hinged member connected above said upper keeper element and projecting outwardly with respect thereto.

7. The invention in accordance with claim 6, and said hinged member having a first nose portion overlapping an entry side of said upper keeper in one position of said hinged member.

8. The invention in accordance with claim 7, and said latch member having a second nose within which said second keeper engaging notch is disposed.

9. The invention in accordance with claim 8, and said second nose during upward hinging movement of said second deck engaging said first nose of said hinged member to move the same out of blocking position to permit engagement of said upper keeper by said second keeper engaging notch.

10. The invention in accordance with claim 9, and said second nose having an inclined face engaged in sliding relation by said first nose of said blocking element during hinging movement of said second section.

* * * * *